US010561063B2

(12) United States Patent
Hasegawa et al.

(10) Patent No.: US 10,561,063 B2
(45) Date of Patent: Feb. 18, 2020

(54) AUTONOMOUS LAWNMOWER USING LASER SCANNER

(71) Applicant: HONDA MOTOR CO., LTD., Tokyo (JP)

(72) Inventors: Toshiyuki Hasegawa, Durham, NC (US); Jeffrey Allen Wians, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 283 days.

(21) Appl. No.: 15/867,386

(22) Filed: Jan. 10, 2018

(65) Prior Publication Data
US 2019/0208699 A1 Jul. 11, 2019

(51) Int. Cl.
| | |
|---|---|
| *A01D 34/00* | (2006.01) |
| *G05D 1/02* | (2006.01) |
| *G05D 1/00* | (2006.01) |
| *G01S 17/89* | (2006.01) |
| *A01B 69/04* | (2006.01) |
| *G01S 17/93* | (2020.01) |
| *G01S 17/88* | (2006.01) |
| *G01S 7/48* | (2006.01) |
| *G01S 17/42* | (2006.01) |

(Continued)

(52) U.S. Cl.
CPC .......... *A01D 34/008* (2013.01); *A01B 69/008* (2013.01); *A01D 34/006* (2013.01); *G01S 7/4802* (2013.01); *G01S 7/4808* (2013.01); *G01S 17/42* (2013.01); *G01S 17/88* (2013.01); *G01S 17/89* (2013.01); *G01S 17/936* (2013.01); *G05D 1/0011* (2013.01); *G05D 1/0061* (2013.01); *G05D 1/0088* (2013.01); *G05D 1/024* (2013.01); *G05D 1/0214* (2013.01); *G05D 1/0219* (2013.01); *G05D 1/0242* (2013.01); *G05D 1/0246* (2013.01); *A01D 34/64* (2013.01); *A01D 69/02* (2013.01); *A01D 2101/00* (2013.01); *G05D 2201/0208* (2013.01)

(58) Field of Classification Search
CPC .. A01D 34/006; A01D 34/008; G05D 1/0246; G05D 1/0088; G01S 17/89
See application file for complete search history.

(56) References Cited

U.S. PATENT DOCUMENTS

| | | | |
|---|---|---|---|
| 4,318,266 A | 3/1982 | Taube | |
| 6,611,738 B2 * | 8/2003 | Ruffner | ................ A01D 34/008 701/23 |

(Continued)

*Primary Examiner* — Alicia Torres
(74) *Attorney, Agent, or Firm* — Arent Fox LLP

(57) ABSTRACT

A lawnmower includes a cutting blade, a laser scanner rotatably mounted above the cutting blade, a first motor rotatably driving the laser scanner, and a processor communicatively coupled to the laser scanner. The processor may obtain laser scanner measurements of a plurality of angles around the lawnmower, each laser scanner measurement including a distance and a received signal strength. The processor may classify a surface at each of the angles based on the distance and the received signal strength. The processor may determine a navigation path of the lawnmower based on the classification of the surface at each of the angles. The lawnmower may also include a second motor operably coupled to one or more drive wheels. The processor may control the second motor to move the lawnmower along the navigation path.

20 Claims, 10 Drawing Sheets

(51) Int. Cl.
    *A01D 101/00*     (2006.01)
    *A01D 34/64*     (2006.01)
    *A01D 69/02*     (2006.01)

(56) References Cited

U.S. PATENT DOCUMENTS

| | | |
|---|---|---|
| 8,666,550 B2 | 3/2014 | Anderson et al. |
| 9,510,505 B2 | 12/2016 | Halloran et al. |
| 9,609,858 B2 | 4/2017 | Stowe et al. |
| 9,848,529 B2 * | 12/2017 | Franzius ............... A01D 34/008 |
| 2012/0112896 A1 * | 5/2012 | Clair .................... A01B 69/008 340/436 |
| 2016/0129593 A1 | 5/2016 | Wolowelsky et al. |
| 2017/0118915 A1 | 5/2017 | Middelberg et al. |

\* cited by examiner

Angle results 100.0° B1
50.0° B2
0.0° C3  → U-turn left
-50.0° C4
-100.0° C5

AUTONOMOUS LAWNMOWER USING LASER SCANNER

TECHNICAL FIELD

Aspects of the present disclosure relate to power equipment and methods of operating thereof, and in particular to systems, devices and methods of autonomously operating a lawnmower, snow blower or other power equipment products.

BACKGROUND

Lawn care can be a tedious task for a homeowner. Frequent mowing may be both time consuming and physically tiring. Traditional lawnmowers require an operator to push the mower over an entire area of the lawn. Although riding and self-propelled mowers reduce the physical effort, a human operator still drives the lawnmower to cover the entire lawn.

Robotic lawnmowers that automatically mow a lawn have become available. Current robotic lawnmowers typically use a buried guidewire to determine the boundaries of a lawn. Installation of such guidewires may also be a labor intensive task. Additionally, a satellite based positioning system (e.g., Global Positioning System (GPS)) may be used to determine a position of the lawnmower within the boundaries and navigate the robotic lawnmower over the area of the lawn.

In view of the foregoing, there is a need for improved autonomous lawnmower systems. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a lawnmower. The lawnmower may include a cutting blade, a laser scanner rotatably mounted above the cutting blade, a first motor rotatably driving the laser scanner, and a processor communicatively coupled to the laser scanner. The processor may be configured to obtain laser scanner measurements of a plurality of angles around the lawnmower, each laser scanner measurement including a distance and a received signal strength. The processor may be configured to classify a surface at each of the angles based on the distance and the received signal strength. The processor may be configured to determine a navigation path of the lawnmower based on the classification of the surface at each of the angles.

In another aspect, the disclosure provides a method of controlling power equipment. The method may include obtaining laser scanner measurements of a plurality of angles around the power equipment, each laser scanner measurement including a distance and a received signal strength. The method may include classifying a surface at each of the angles based on the distance and the received signal strength. The method may include determining a navigation path of the power equipment based on the classification of the surface at each of the angles. The power equipment may be, for example, a lawnmower, a snow blower or other power equipment products.

In another aspect, the disclosure provides a computer-readable medium storing executable code for controlling a lawnmower. The computer-readable medium may include code to obtain laser scanner measurements of a plurality of angles around the lawnmower from a laser scanner rotatably mounted to the lawnmower above a cutting blade at a downward angle, each laser scanner measurement including a distance and a received signal strength. The computer-readable medium may include code to classify a surface at each of the angles based on the distance and the received signal strength. The computer-readable medium may include code to determine a navigation path of the lawnmower based on the classification of the surface at each of the angles.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

It should be understood that the description and drawings herein are merely illustrative and that various modifications and changes can be made in the structures disclosed without departing from the present disclosure. In general, the figures of the example lawnmower are not to scale. As used herein, lateral directions are transverse across the lawnmower, i.e., left and right directions. Likewise, longitudinal directions refer to forward and rearward directions of lawnmower travel, and the vertical directions relate to elevation, i.e., upward and downward directions. It will also be appreciated that the various identified components of the example vehicle door system disclosed herein are merely terms of art that may vary from one manufacturer to another and should not be deemed to limit the present disclosure.

Generally described, the present disclosure provides for a lawnmower including a laser scanner that provides input for autonomous navigation. The laser scanner may be rotatably mounted to the lawnmower and may obtain measurements at a plurality of different angles. The measurements may include a detected distance and an intensity of the detected signal. The lawnmower may include a processor that classifies an object or surface at each of the plurality of angles based on the detected distance and the intensity of the detected signal. The processor may determine a navigation path of the lawnmower based on the classification of the surface at each of the angles. For example, the processor may detect areas of tall grass to cut or the lawnmower may detect objects or hazards to avoid. The lawnmower may include a propulsion system including a drive wheel for driving the lawnmower along the navigation path. The lawnmower may periodically or continuously update the navigation path using the laser scanner. Although an example is described with respect to a lawnmower, similar principles may be applicable to other types of power equipment including trimmers, brush mowers, snow blowers, tillers, cultivators, and harvesters. In particular, in the case of a snow blower, snow may have similar properties as uncut grass when measured with a laser scanner in that the height of the snow changes (ideally to zero) after processing by the snow blower.

Figure 1:
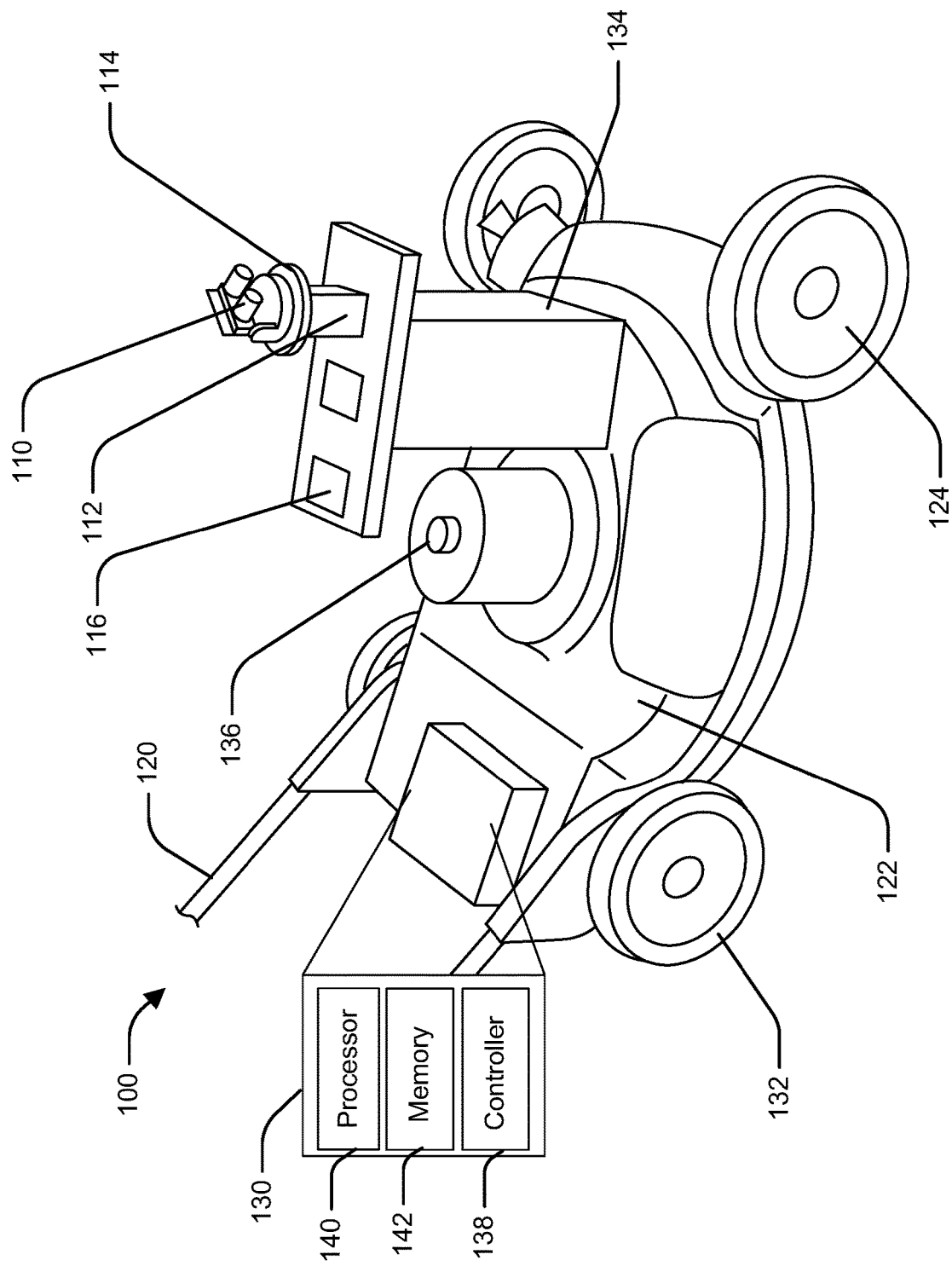
FIG. 1 is a perspective view of an example lawnmower, according to an aspect of the disclosure.

Turning to the figures, where like reference numbers refer to like components, FIG. 1 illustrates an example lawnmower 100. In an aspect, the lawnmower 100 may include some components of a conventional lawnmower. For example, the lawnmower 100 may include a handle 120, a deck or body 122, front wheels 124, a battery 134, and a blade motor 136. It should be appreciated that although depicted in an example arrangement, the conventional lawnmower components may be arranged or substituted according to other known designs or modified as appropriate for a particular goal.

The lawnmower 100 may include a laser scanner 110. The laser scanner 110 may be referred to as a Light Detection and Ranging (LIDAR) device. In an aspect, a one dimensional LIDAR device may be used. A one-dimensional LIDAR device may measure a detected distance and received signal strength of the reflected light. Although more complicated two-dimensional and three-dimensional LIDAR devices are available and may be used in accordance with aspects of the present invention, a one-dimensional LIDAR device may be more economical. The laser scanner 110 may be rotatably mounted to the body 122 of the lawnmower 100. For example, the laser scanner 110 may be mounted above the blade motor 126 and/or the battery 134. As discussed in further detail below, the laser scanner 110 may scan areas around the lawnmower 100 at various angles by projecting a light beam at a downward angle. Accordingly, the mounting location of the laser scanner 110 is preferably in a forward portion of the lawnmower 100 at a height that provides an unobstructed path to the scanned areas around the lawnmower 100. For example, the laser scanner 110 may be mounted at a height greater than a height of the front wheels 124. In an aspect, the laser scanner 110 may be mounted to a height adjustment mechanism (e.g., telescoping pole). The height may be adjusted based on environmental conditions such as a height of the grass to be mowed.

The laser scanner 110 may be rotatably mounted to the lawnmower 100. For example, the laser scanner 110 may be mounted to a servo motor 112 via a rotatable drive pulley 114. For instance, the drive pulley 114 may be connected to the servo motor 112 via a belt or gear. The lawnmower 100 may also include a controller 116 for electronically controlling the laser scanner 110 and the servo motor 112. In an aspect, the laser scanner 110 may have limited rotation, for example, due to wiring. The controller 116 may reciprocally rotate the laser scanner 110 along an arc centered in the forward direction. That is, the laser scanner 110 may sweep the arc in a first direction, then the servo motor 112 may reverse direction and sweep the arc in the opposite direction. In another aspect, the laser scanner 110 may be mounted using a wiring harness and slip ring that allows the laser scanner 110 to be continuously rotated in the same direction and obtain measurements along the 360 degree rotation.

The lawnmower 100 may include a propulsion system 130. The propulsion system 130 may include one or more drive motors (not shown) under the body 122 and one or more drive wheels 132. The propulsion system 130 may include a controller 138 that controls the drive motors to drive the lawnmower 100 along a navigation path. For example, the drive motors may be installed at the rear wheel location. The drive motors may be three-phase brushless motors that drive the drive wheels via planetary gears. The motors may be connected to the controller 138 via a serial communication interface for traction control and motor temperature information. The motor controller 138 may use a command type communication protocol utilizing half-duplex asynchronous serial communication. The processor may prepare command packets to send to the motor controller 138. Simplified command packets may include, for example, forward, reverse, turn right, turn left, and stop commands. In an aspect, the lawnmower 100 may be controllable via wireless remote. The wireless remote may generate command packets based on input from an operator and transmit the command packets to the controller 138 via a wireless network connection (e.g., wi-fi). The command packets from the wireless remote may provide for manual override of autonomous control of the lawnmower 100. The wireless remote may also transmit a command to activate or deactivate an autonomous mowing mode.

The lawnmower 100 may also include a processor 140 and memory 142 that determine the navigation path based on input from the laser scanner 110. For example, the processor 140 and memory 142 may be located within the propulsion system 130. The memory 142 may be configured for storing data and/or computer-executable instructions defining and/or associated with an operating system and/or application, and processor 140 may execute the operating system and/or application. An example of memory 142 can include, but is not limited to, a type of memory usable by a computer, such as random access memory (RAM), read only memory (ROM), tapes, magnetic discs, optical discs, volatile memory, non-volatile memory, and any combination thereof. Memory 142 may store local versions of applications being executed by processor 140.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations.

Figure 2:
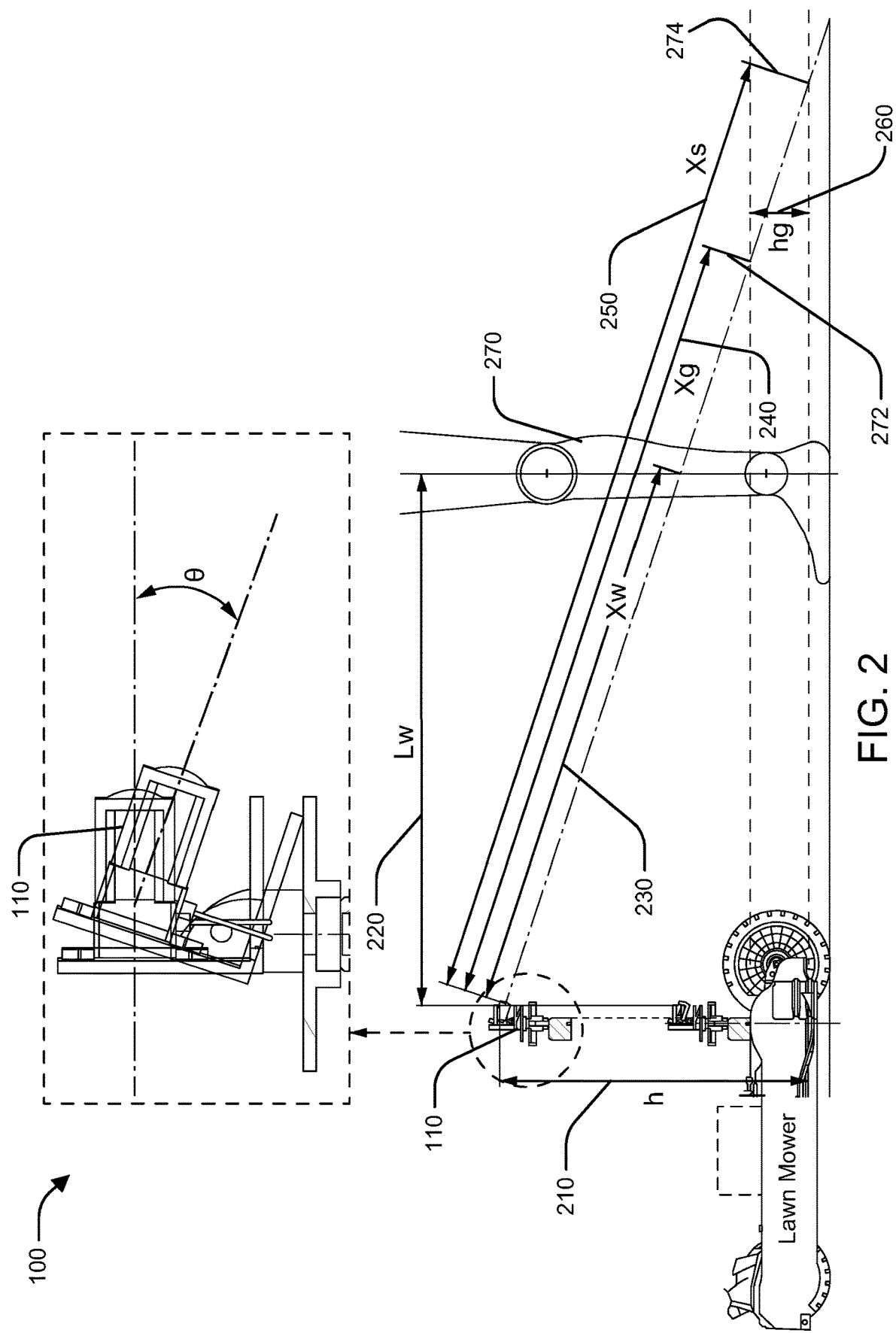
FIG. 2 is a schematic diagram of operation of a laser scanner, according to an aspect of the disclosure.

Turning to FIG. 2, the laser scanner 110 may be directed at a downward angle θ. For example, the downward angle θ may be measured as an angle between horizontal and the direction of the laser scanner 110. Generally, the downward angle θ may be fixed during operation of the lawnmower 100. In an aspect, however, the downward angle θ may be adjusted or calibrated. For example, an adjustment screw may be used to vary the downward angle θ. As discussed in further detail below, the downward angle θ may be related to detection distances.

In an aspect, the processor 140 may classify detected objects or surfaces based on a distance measured by the laser scanner 110. FIG. 2, for example, illustrates detection of an object 270 (e.g., a human leg), tall grass 272, and a surface 274. The object 270, tall grass 272, and surface 274 may each be detected with the laser scanner 110 at the fixed downward angle θ. For example, because the object 270 extends above the grass, the laser scanner 110 may detect the object 270 at the distance Lw 220 with a measurement of Xw 230. It should be appreciated that the laser scanner 110 may detect the object 270 at further distances, but the processor 140 may not classify the object 270 as an object at that distance. Instead, the processor 140 may determine that a measurement of Xw 230 indicates an object when the value of the measurement Xw 230 is less than an object detection threshold. The object detection threshold may be defined by the following formula:

$$Xw = \frac{Lw}{\cos\theta}, L > Lw \qquad (1)$$

The variable Lw may be a configurable distance to the object. For example, in an implementation, Lw may be set to approximately 100 cm to provide a collision avoidance area around the lawnmower 100 (e.g., to provide enough time for the lawnmower 100 to detect the object and stop movement). If the laser scanner 110 provides a measurement less than Xw, the processor 140 may determine that an object 270 is within Lw of the lawnmower 100, and respond appropriately as discussed in further detail below.

The laser scanner 110 may detect a measurement of Xg 240, which the processor 140 may determine is tall grass 272. Tall grass may refer to any grass that is above a threshold height hg 260. The height of the tall grass may provide the measurement Xg less than a grass detection threshold. In contrast, the laser scanner 110 may detect the surface 274 at a measurement Xs 250. The measurement Xs 250 may be greater than the grass detection threshold. The measurement Xs may be the maximum expected distance measurement The grass detection threshold may be determined by the following equation:

$$xg = \frac{(h-hg)}{\sin\theta} \qquad (2)$$

The maximum surface detection distance may be defined by the following equation:

$$xs = \frac{h}{\sin\theta} \qquad (3)$$

Noise reduction can be used to eliminate measurements that do not fit the following formula:

$$\frac{xw}{2} \approx xg - xw \approx xs - xg \qquad (4)$$

The processor 140 may also classify detected objects or surfaces based on a signal strength detected by the laser scanner 110.

Figure 3:
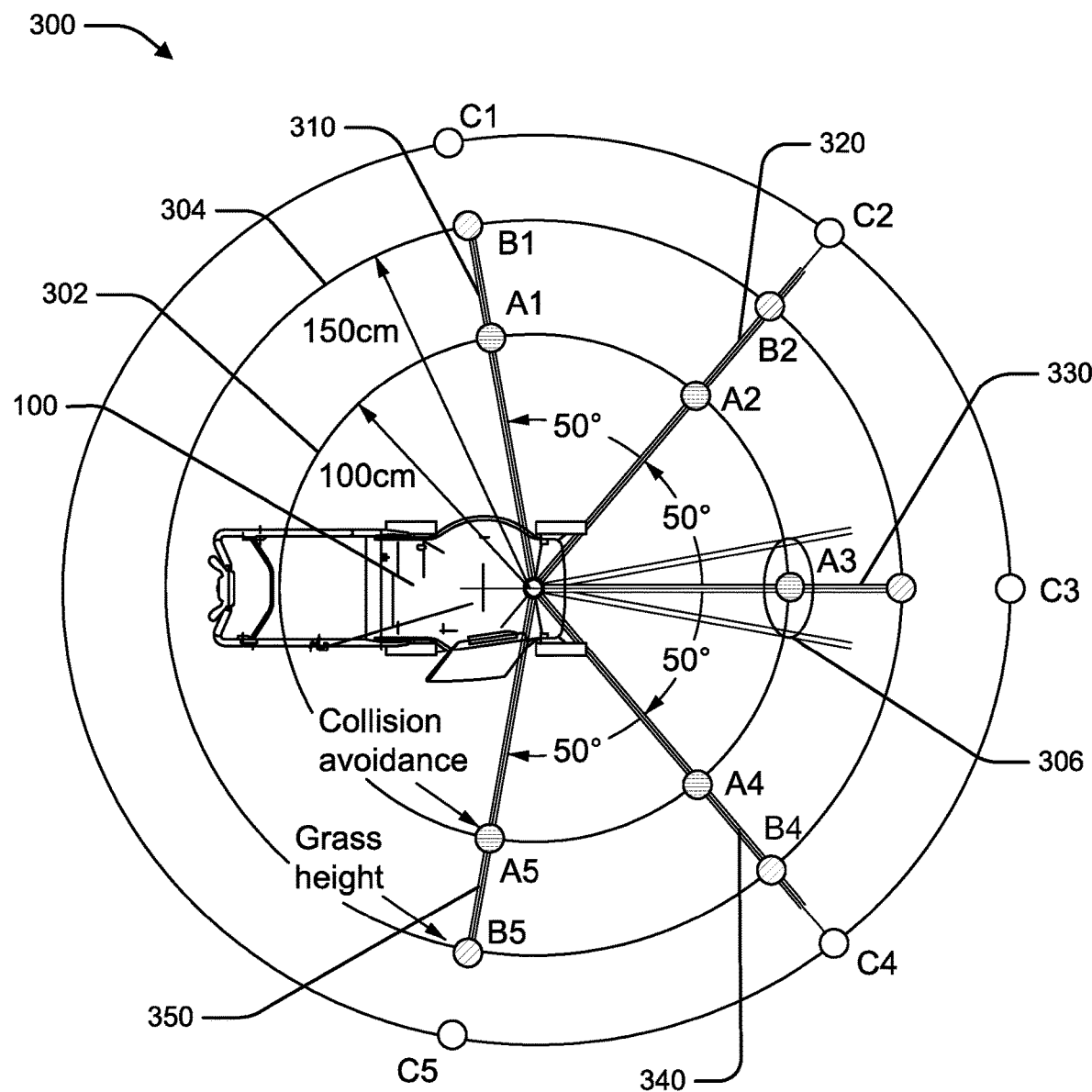
FIG. 3 is a schematic diagram of laser measurements at a plurality of angles, according to an aspect of the disclosure.

FIG. 3 is a schematic diagram 300 of laser measurements at a plurality of angles, according to an aspect of the disclosure. As illustrated, in an implementation, the plurality of angles may be spaced approximately 50° apart to provide coverage of potential directions of movement while minimizing a number of measurements used. In an aspect, the number of measurements and the angle between measurements may be varied. For example, if animals, children, or other obstacles are expected in a mowing area, the number of measurements may be increased to improve detection.

As illustrated in FIG. 3, a measurement angle 330 may correspond to a forward direction of the lawnmower 100. The measurement angle 330 may be referred to as 0°. In an aspect, the laser scanner 110 may be oriented at the measurement angle 330 while the lawnmower 100 is moving. Accordingly, the laser scanner 110 may detect objects that move into the path of the lawnmower 100 during operation. When the lawnmower 100 detects a change in conditions (e.g., obstacle, cut grass, or non-grass surface), the lawnmower 100 may stop and rotate the laser scanner 110 to measure at one of the other measurement angles. The measurement angle 320 may be a forward-left measurement angle. The measurement angle 310 may be a left measurement angle, the measurement angle 340 may be a forward-right measurement angle. The measurement angle 350 may be a right measurement angle.

The laser scanner 110 or processor 140 may classify measurements at any of the measurement angles 310, 320, 330, 340, 350 based on distance. In an aspect, for example, an object detection threshold 302 may be set at a distance of 100 cm (A distance) and a grass detection threshold 304 (B distance) may be set at a distance of 150 cm. If the laser scanner 110 detects an A distance, the processor 140 may determine an object is located at the measurement angle. If the laser scanner 110 detects a B distance, the processor 140 may determine that there is tall grass to mow at the measurement angle. If the laser scanner 110 detects a distance greater than the grass detection threshold (C distance), the processor 140 may determine that there is a lower surface (e.g., previously mowed grass, sidewalk, or driveway) at the measurement angle. Additionally, the laser scanner 110 may have an echo width 306 that determines how far from the measurement angle a detection may occur. For example, the echo width 306 may be approximately 1 to 10 degrees, and may be configurable.

Figure 4:
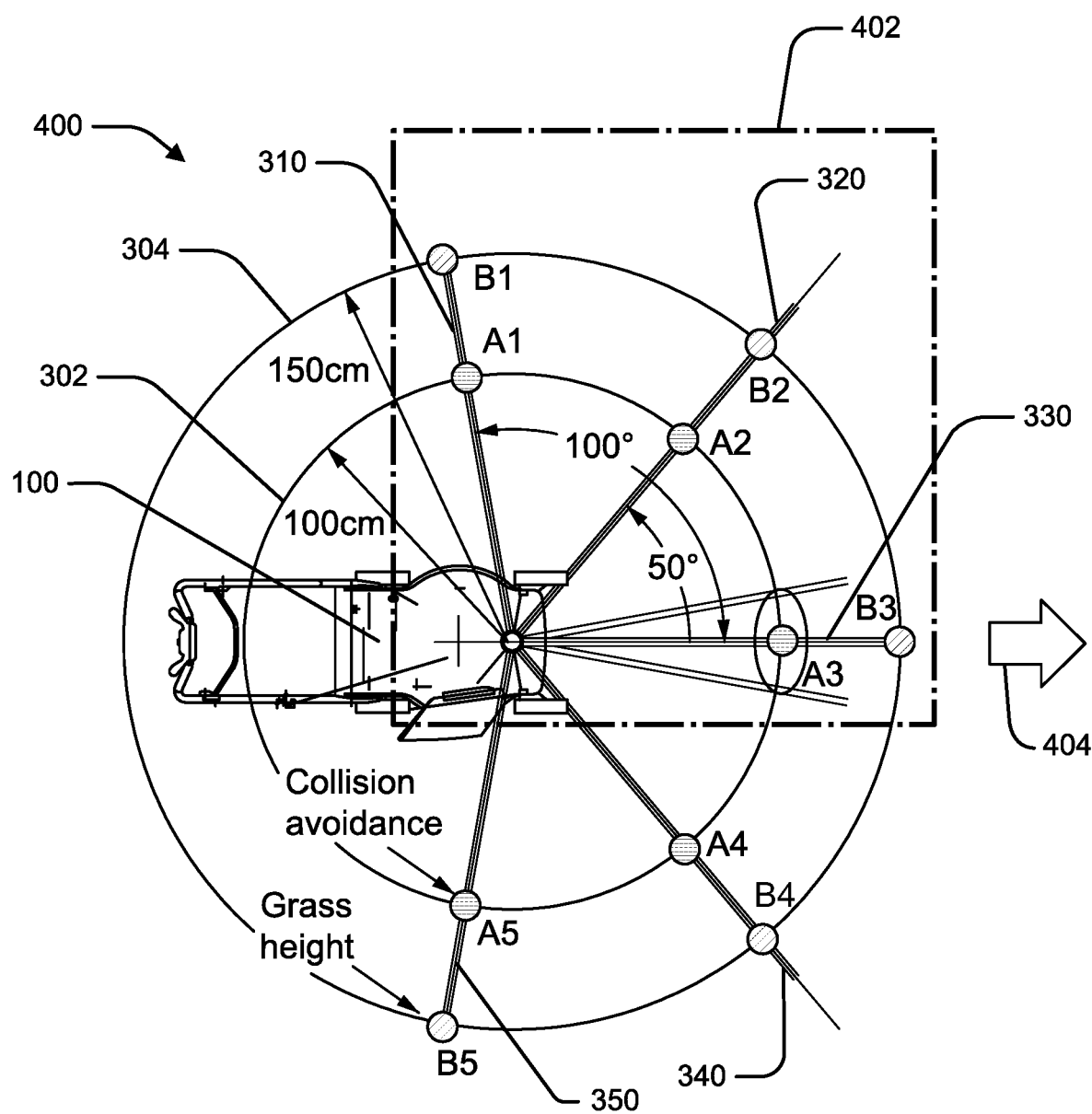
FIG. 4 is a schematic diagram of laser measurements at a plurality of angles in a first scenario, according to an aspect of the disclosure.

FIG. 4 is a schematic diagram of possible laser measurements at a plurality of angles in a first scenario 400. The lawnmower 100 may be located at a corner of unmowed grass area 402. The area surrounding the unmowed grass area 402 may be a lower surface such as mowed grass, concrete, asphalt, or dirt. Generally, the processor 140 may utilize a strategy that directs the lawnmower 100 toward unmowed grass area 402 while avoiding obstacles. The processor 140 may generally avoid lower surfaces, but may control the lawnmower 100 to cross lower surfaces if the lower surface is not detected as a hazard.

In the scenario 400, the lawnmower 100 may be moving forward and the laser scanner 110 may measure a B3 distance a the measurement angle 330, which the processor 140 may classify as tall grass. The processor 140 may also classify the measurement at measurement angle 330 as tall grass based on the signal strength of the measurement. In an aspect, the lawnmower may continue moving forward based on the detection of tall grass in the forward direction along measurement angle 330. The laser scanner 110 may alternatively measure each of the measurement angles. As illustrated, the laser scanner 110 may measure a B1 distance at measurement angle 310, a B2 distance at measurement angle 320, the B3 distance at measurement angle 330, a C4 distance at measurement angle 340, and a C5 distance at measurement angle 350. Accordingly, the processor 140 may determine that the unmowed grass area 402 is generally forward and to the left and that the area to the right is a lower surface. The processor 140 may determine a navigation path 404, which may include continuing in the forward direction.

Figure 5:
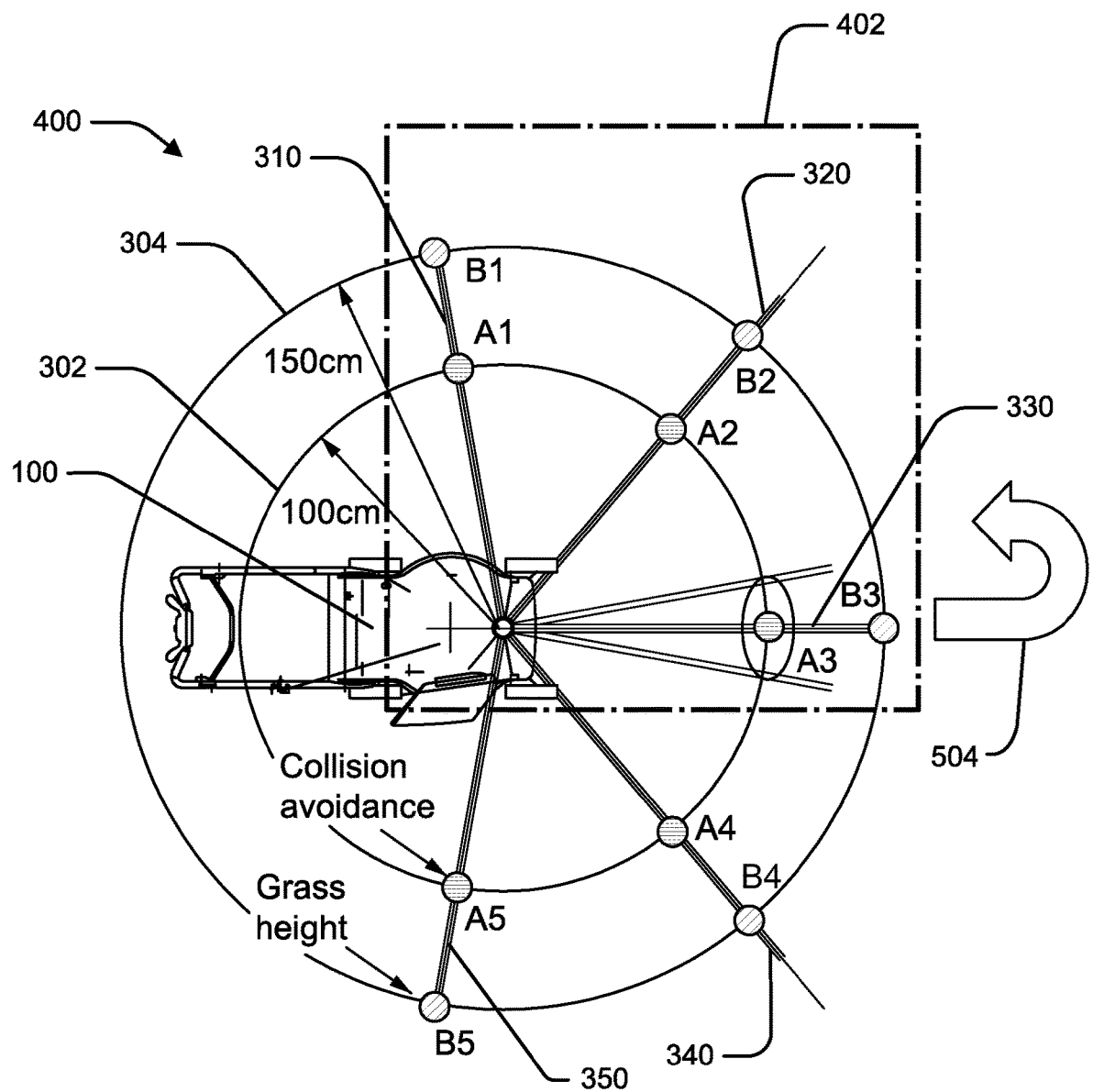
FIG. 5 is a schematic diagram of example laser measurements at a plurality of angles in a second scenario, according to an aspect of the disclosure.

FIG. 5 is a schematic diagram of example laser measurements at a plurality of angles in a second scenario 500. The scenario 500 may be similar to the scenario 400 except the lawnmower 100 has moved forward within the unmowed grass area 402. The laser scanner 110 may detect a different distance for the measurement angle 330. For example, the laser scanner 110 may measure a C3 distance at measurement angle 330. The processor 140 may stop the lawnmower 100 to determine additional measurements. As illustrated, the laser scanner 110 may measure a B1 distance at measurement angle 310, a B2 distance at measurement angle 320, the C3 distance at measurement angle 330, a C4 distance at measurement angle 340, and a C5 distance at measurement angle 350. Accordingly, the processor 140 may determine that the unmowed grass area 402 is generally to the left and stops shortly (i.e., within the grass detection threshold) in the forward direction and that the area to the right is a lower surface. Therefore, the processor 140 may determine a navigation path 504 that includes a turn to the left. The navigation path may also be based on a mowing pattern. For example, in a straight mowing pattern, the processor may determine a navigation path 504 that includes a U-turn at the end of the unmowed area 402. As another example, in a spiral mowing pattern, the processor may determine a navigation path 504 that includes a left turn at the end of the unmowed area 402.

Figure 6:
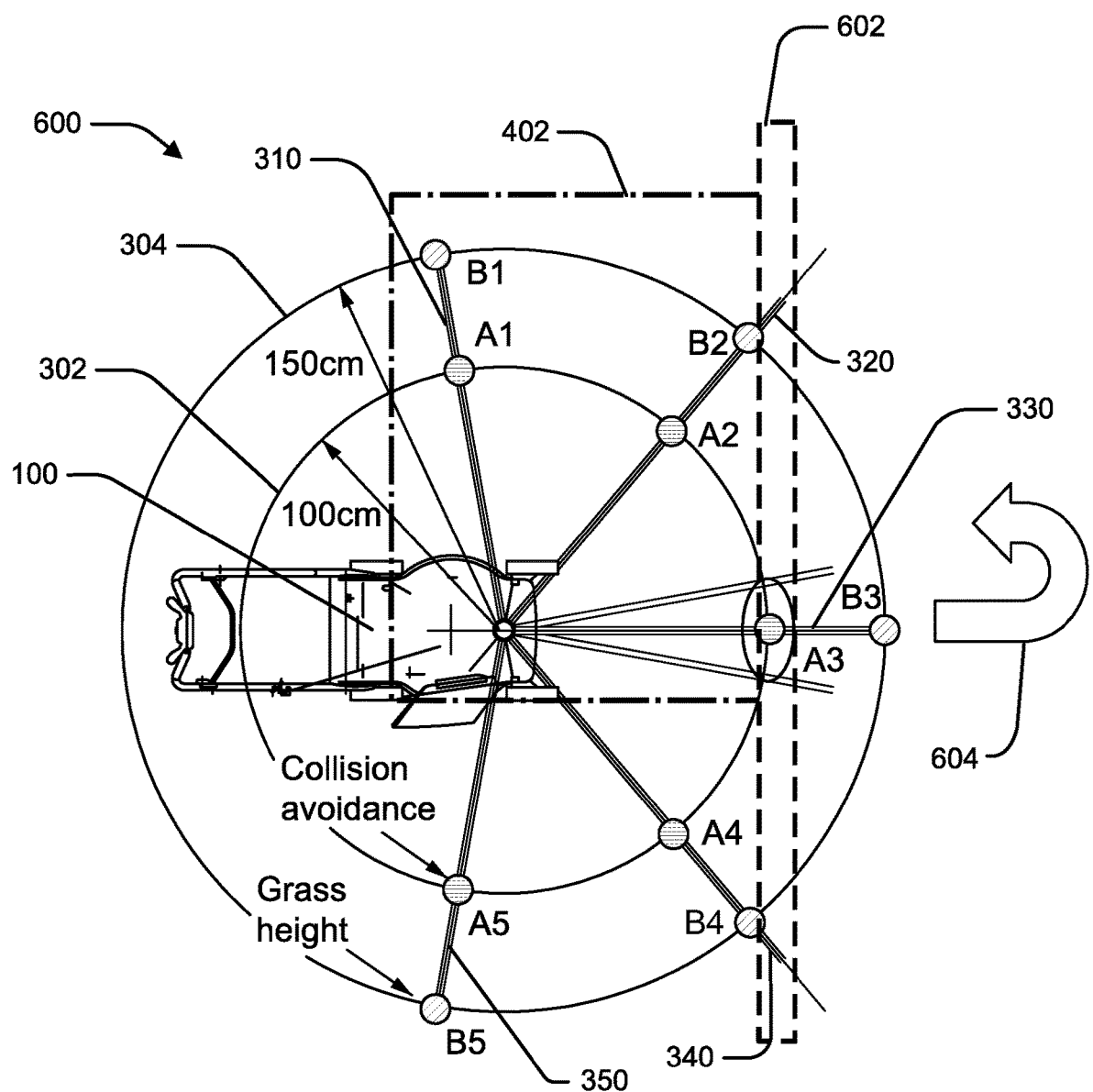
FIG. 6 is a schematic diagram of example laser measurements at a plurality of angles in a third scenario, according to an aspect of the disclosure.

FIG. 6 is a schematic diagram of example laser measurements at a plurality of angles in a third scenario 600. The scenario 600 may be similar to the scenario 400 except the unmowed grass area 402 may be bounded by a fence 602 along at least one side. The laser scanner 110 may measure an A3 distance at measurement angle 330. The processor 140 may stop the lawnmower 100 to determine additional measurements. As illustrated, the laser scanner 110 may measure a B1 distance at measurement angle 310, a B2 distance at measurement angle 320, the A3 distance at measurement angle 330, a B4 distance at measurement angle 340 (e.g., due to the fence 602), and a C5 distance at measurement angle 350. Accordingly, the processor 140 may determine that an object is in front of the lawnmower 100 based on the A3 distance. The B4 distance may be the fence 602, or could be unmowed grass. The C5 measurement, however, indicates a lower surface to the right. Accordingly, the processor 140 may determine that the unmowed area 402 is generally to the left and determine the navigation path 604, which may include a turn. Similarly, if the measurement angle 350 detected an A5 measurement due to a fence to the right, the results may be the same. As above, the navigation path 604 may be a U-turn or a left turn depending on the mowing pattern.

Figure 7:
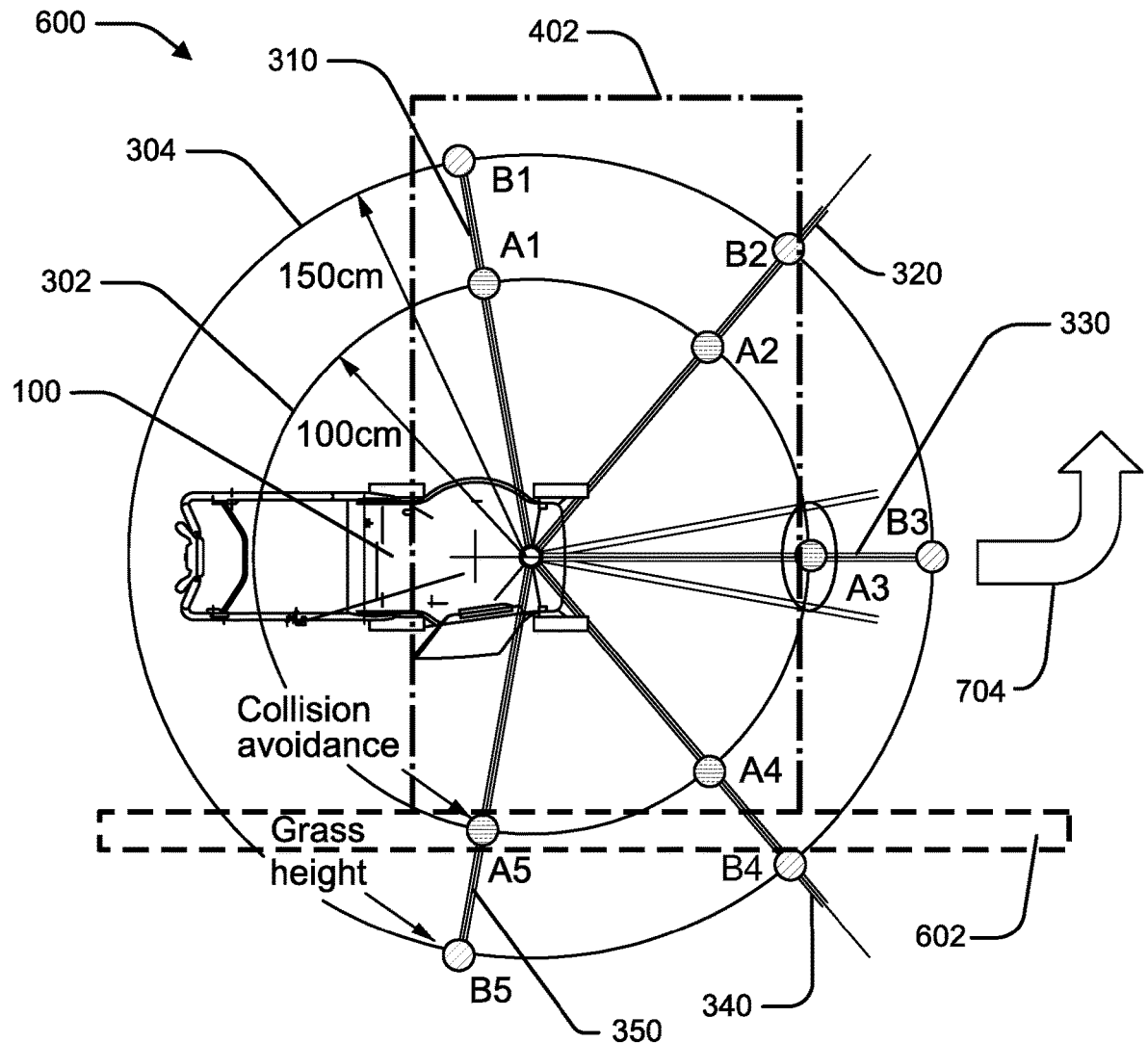
FIG. 7 is a schematic diagram of example laser measurements at a plurality of angles in a fourth scenario, according to an aspect of the disclosure.

FIG. 7 is a schematic diagram of example laser measurements at a plurality of angles in a fourth scenario 700. The scenario 700 may be similar to the scenario 600 except the lawnmower 100 may be positioned with the fence 602 to the right side. For example, the scenario 700 may follow the scenario 600 using a spiral mowing pattern. The laser scanner 110 may measure an A3 distance at measurement angle 330. The processor 140 may stop the lawnmower 100 to determine additional measurements. As illustrated, the laser scanner 110 may measure a B1 distance at measurement angle 310, a B2 distance at measurement angle 320, a C3 distance at measurement angle 330, a B4 distance at measurement angle 340 (e.g., due to either unmowed grass area 402 or the fence 602), and a C5 distance at measurement angle 350 due to the fence 602. Accordingly, the processor 140 may determine that the unmowed grass area 402 is generally to the left and stops shortly (i.e., within the grass detection threshold) in the forward direction and that the area to the right is blocked by a fence. Therefore, the processor 140 may determine a navigation path 704 that includes a turn to the left. The navigation path 704 may include a left turn under either the straight mowing pattern or the spiral mowing pattern to move the lawnmower away from the fence 602.

Figure 8:
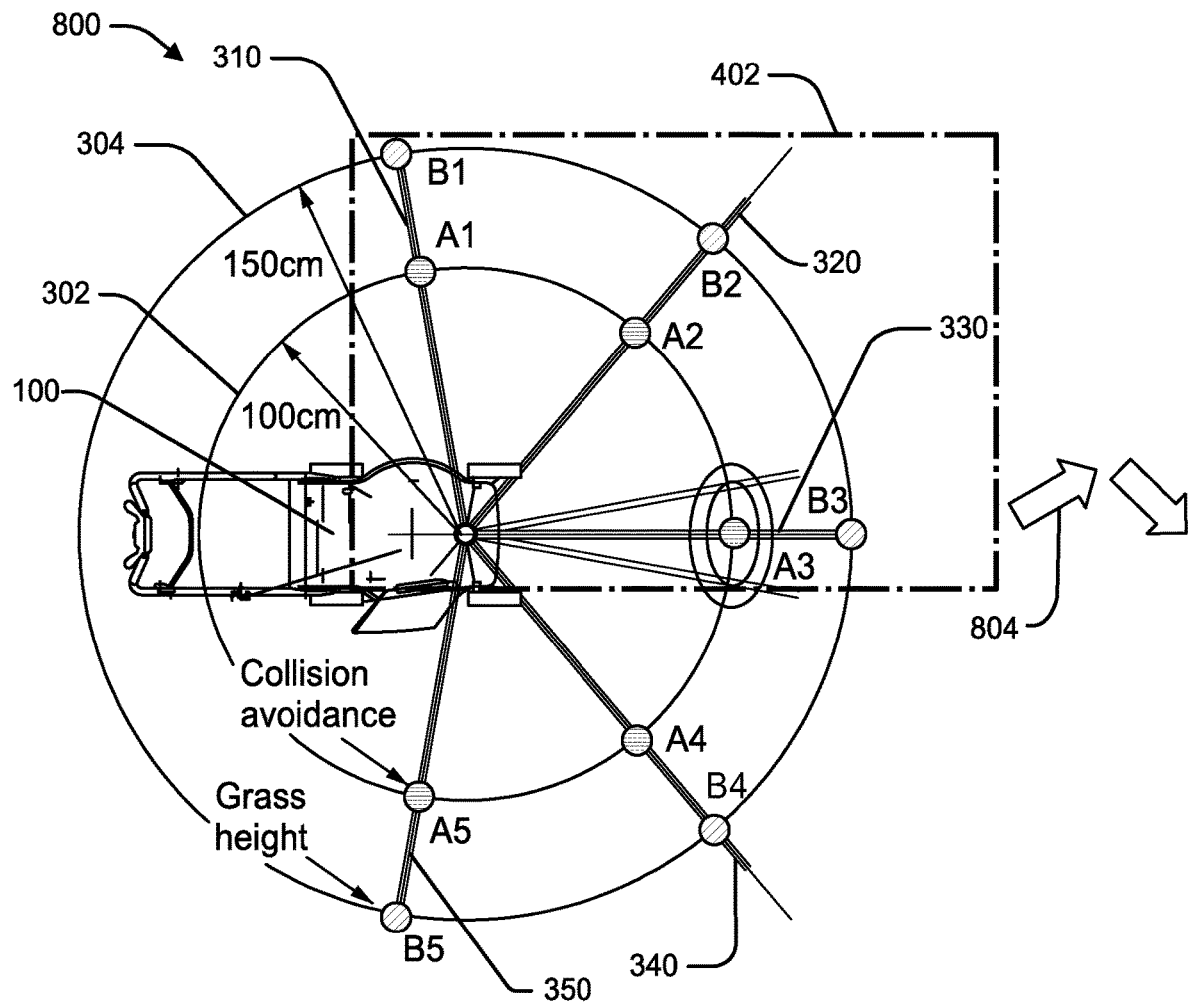
FIG. 8 is a schematic diagram of example laser measurements at a plurality of angles in a fifth scenario, according to an aspect of the disclosure.

FIG. 8 is a schematic diagram of example laser measurements at a plurality of angles in a fifth scenario 800. The scenario 800 may be similar to the scenario 400 except an obstacle 802 may be located in front of the lawnmower 100. The laser scanner 110 may measure an A3 distance at measurement angle 330. The processor 140 may stop the lawnmower 100 to determine additional measurements. As illustrated, the laser scanner 110 may measure a B1 distance at measurement angle 310, a B2 distance at measurement angle 320, the A3 distance at measurement angle 330, a C4 distance at measurement angle 340, and a C5 distance at measurement angle 350. Accordingly, the processor 140 may determine that the unmowed grass area 402 is generally to the left based on the B1 and B2 measurements. The processor 140 may determine that an object is located to the front based on the A3 measurement, but that the object is relatively small (i.e., not a fence) based on the B2 and C4 measurements. Accordingly, the processor 140 may determine a navigation path 804 that attempts to avoid the obstacle 802. For example, the navigation path 804 may include tilting (e.g., turning 45°) toward the unmowed area 402. The processor 140 may then advance the lawnmower 100 in the forward direction a short distance and perform measurements again. If the laser scanner 110 measures a B4 distance at the measurement angle 340, the processor 140 may determine that the lawnmower 100 has moved past the obstacle 802, and execute a right turn. The processor 140 may then control the lawnmower 100 to move forward until a C3 distance is detected indicating the end of the unmowed area 402. In order to maintain a rectilinear mowing pattern, the processor 140 may control the lawnmower 100 to execute a 45° left turn upon reaching the end of the unmowed area 402.

Figure 9:
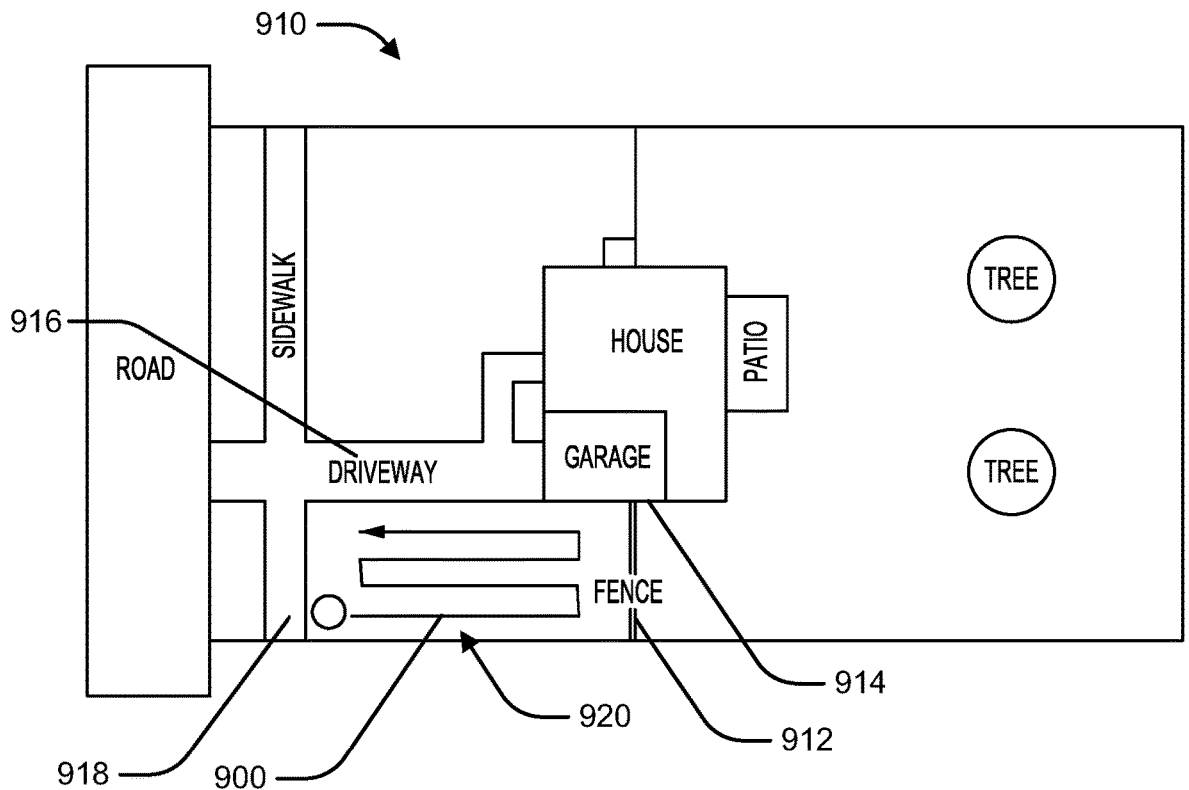
FIG. 9 is a schematic diagram of a first example mowing pattern, according to an aspect of the disclosure.

FIG. 9 is a schematic diagram of a first example mowing pattern 900 in a residential property 910. The residential property 910 may include a fence 912, a house wall 914, a driveway 916, a sidewalk 918, and a mowing area 920. The lawnmower 100 may be manually or remotely positioned at a corner of the mowing area 920. Autonomous navigation may be activated when the lawnmower 100 is positioned within the mowing area 920. If the borderline between the residential property 910 and a neighboring property does not have a fence, the lawnmower 100 may first mow a path along the property line. The first path may be mowed manually or by remote control. Alternatively, the processor 140 may be configured with a first turning direction to avoid entering the neighboring property, and the lawnmower 100 may autonomously mow the first path. Once the first path is mowed, the lawnmower may mow the mowing area 920 under autonomous control by the processor 140 according to the scenarios described above. For example, upon reaching the fence 912, the lawnmower 100 may operate in scenario 600 to make a left U-turn. Upon reaching the sidewalk 918, the lawnmower 100 may operate in the mirror image of scenario 500 to make a right U-turn. The lawnmower 100 may continue until the mowing pattern 900 is complete.

Figure 10:
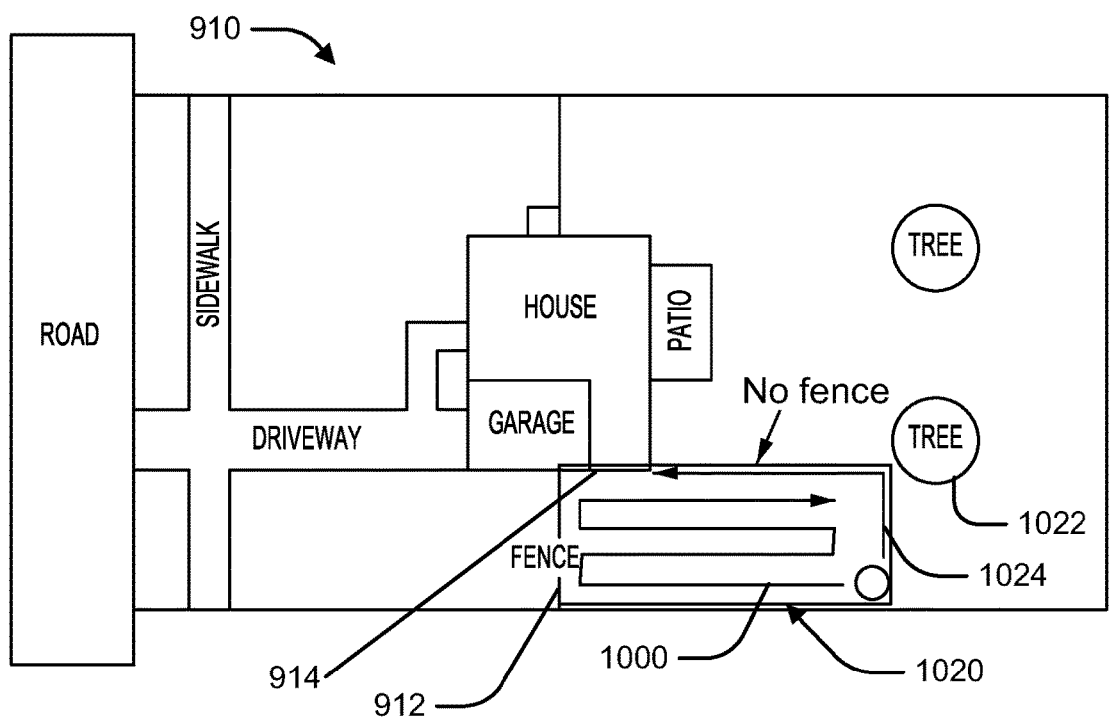
FIG. 10 is a schematic diagram of a second example mowing pattern, according to an aspect of the disclosure.

FIG. 10 is a schematic diagram of a second example mowing pattern 1000 in another mowing area 1020 of the residential property 910. The mowing area 1020 may be partially bounded by the fence 912 and the house wall 914. Trees 1022 may be located near the mowing area 1020, but may not be dense enough to be interpreted by the processor 140 as a fence. That is, when approaching a tree 1022, the laser scanner 110 may measure a B2 distance along measurement angle 320 or a B4 distance along measurement angle 340 indicating additional mowing area. Accordingly, if the lawnmower 100 is to be confined to the mowing area 1020, a boundary line 1024 may be mowed first before positioning the lawnmower 100 at the corner of the mowing area.

Figure 11:
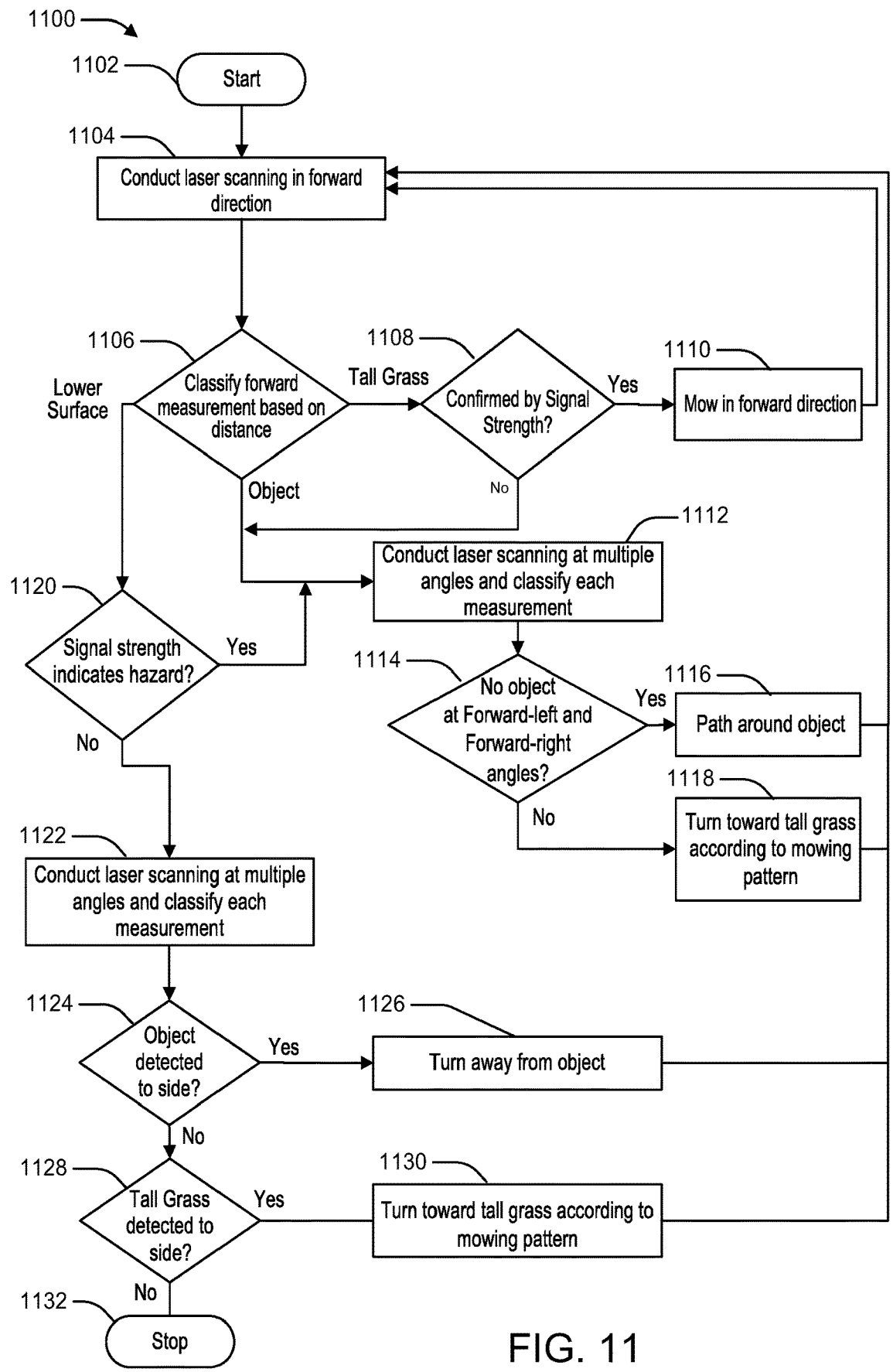
FIG. 11 is a flowchart of an example method for determining a navigation path of a lawnmower, according to an aspect of the disclosure.

FIG. 11 is a flowchart of an example method 1100 for determining a navigation path of a lawnmower. For example, the method 1100 may be performed by the processor 140 to control the lawnmower 100. More specifically, the method 1100 may include controlling the laser scanner 110 and propulsion system 130 of the lawnmower 100. The method 1100 may start at block 1102 and proceed to 1104 upon activation of an autonomous mowing mode. For example, an operator may activate the autonomous mode via a switch on the lawnmower 100 or via a remote control.

At block 1104, the method 1100 may include conducting laser scanning in a forward direction. For example, the processor 140 may control the laser scanner 110 to scan in the measurement angle 330. Block 1104 may occur continuously or periodically when the lawnmower 100 is in the scenario 400. The laser scanner 110 may produce a measurement including a measured distance and a signal strength. The method 1100 may proceed to block 1106.

At block 1106, the method 1100 may include classifying the forward measurement based on the distance component of the forward measurement. As discussed above, the laser scanner 110 may be directed in a downward direction θ and a grass detection threshold and object detection threshold may be defined based on the downward direction θ, height of the laser scanner 110, and height of the grass. The processor 140 may classify the forward measurement as an object if the distance is less than the object detection threshold. The processor 140 may classify the forward measurement as tall grass if the distance is greater than the object detection threshold and less than the grass detection threshold. The processor 140 may classify the forward measurement as a lower surface if the distance is greater than the grass detection threshold. If the processor 140 classifies the forward measurement as tall grass, the method 1100 may proceed to block 1108. If the processor 140 classifies the forward measurement as an object, the method 1100 may proceed to block 1112. If the processor 140 classifies the forward measurement as a lower surface, the method 1100 may proceed to block 1120.

At block 1108, the method 1100 may include confirming whether the forward measurement corresponds to tall grass based on the signal strength of the forward measurement. In an aspect, tall grass may generate a relatively high signal strength of the reflected light detected by the laser scanner 110. Accordingly, if the signal strength of the forward measurement is greater than a threshold, the processor 140 may confirm that that tall grass is likely in front of the lawnmower 100. If the processor 140 confirms the presence of tall grass, the method 1100 may proceed to block 1110. If the processor 140 cannot confirm the presence of tall grass, the method 1100 may proceed to block 1112 where the forward measurement may be treated as if an object was detected.

At block 1110, the method 1100 may include mowing in a forward direction. For example, the processor 140 may control the propulsion system 130 to drive the lawnmower 100 in the forward direction. The processor 140 may move the lawnmower 100a set distance in the forward direction. The method 1100 may proceed from block 1110 to block 1104. Accordingly, the blocks 1104, 1106, 1108, and 1110 may form a forward mowing loop that may be performed until the laser scanner detects either an object or a lower surface.

At block 1112, the method 1100 may include conducting laser scanning at multiple angles and classifying each measurement. For example, the processor 140 may control the controller 116 and/or the servo motor 112 to rotate the laser scanner 110 to each of the multiple angles to obtain measurements. For instance, the laser scanner may obtain a measurement at each of measurement angles 310, 320, 330, 340, and 350. The processor 140 may classify each of the measurements in the same manner as described above regarding block 1106. That is, the processor 110 may determine whether each measurement angle includes tall grass, an object, or a lower surface in the direction of the measurement angle. The method 1100 may proceed to block 1114.

At block 1114, the method 1100 may include determining whether any object is located in the forward left and forward right angles. In reaching block 1112, the processor 140 may have already determined that an object is located in the forward measurement angle 330. By determining whether any object is located in the forward left measurement angle 320 and the forward right measurement angle 340, the processor 140 may determine whether the object can be avoided. For example, a large object such as a fence will be detected at multiple angles. A smaller object such as a tree may result in tall grass being detected at one or both of the forward left measurement angle 320 and the forward right measurement angle 340. If no object is detected at the forward left measurement angle 320 and the forward right measurement angle 340, the method 1100 may proceed to block 1116. If an object is detected at the forward left measurement angle 320 or the forward right measurement angle 340, the method 1100 may proceed to block 1118.

In block 1116, the method 1100 may include determining a navigation path around the object. For example, as illustrated in FIG. 8, the navigation path 804 may include turning toward the direction in which no object was detected, travelling forward a relatively short distance, and turning back toward the object. The relatively short distance may be a predetermined distance (e.g., 1-2 meters), or the processor 140 may control the lawnmower 100 to move in the forward direction until either the object is no longer detected at the forward left measurement angle 320 or the forward right measurement angle 340 (i.e., the direction opposite the turn), or until another object or lower surface is detected in the forward measurement angle 330. In an aspect, after the initial turn, the method 1100 may return to block 1104 to determine a new navigation path.

In block 1118, the method 1100 may include turning toward tall grass according to a mowing pattern. For example, the lawnmower 100 may be in scenario 600. The processor 140 may determine a direction of the tall grass based on the measurement angles 310 and 350. For instance, in the illustrated scenario 600, the processor 140 may determine to turn the lawnmower 100 to the left based on the detection of tall grass at measurement angles 310. The navigation path 604 may also depend on the configured mowing pattern. For example, in a straight mowing pattern, the navigation path 604 may be a left U-turn whereas in a spiral mowing pattern, the navigation path 604 may be a left turn.

Returning to the case where the forward measurement is classified as a lower surface in block 1106, in block 1120, the method 1100 may include determining whether a signal strength of the forward measurement indicates a hazard. For example, a puddle, pond, swimming pool, or other water surface may be detected as a lower surface. The signal strength of the reflected light from a water surface may be relatively low compared to tall grass or other solid objects. Accordingly, a signal strength below a threshold may indicate a potential hazard. In an aspect, the processor 140 may treat a potential hazard in the same manner as an object to avoid the potential hazard. Accordingly, the method 1100 may proceed to block 1112 when the signal strength indicates a hazard. If no hazard is indicated, the method 1100 may proceed to block 1122.

At block 1122, the method 1100 may include conducting laser scanning at multiple angles and classifying each measurement. For example, the processor 140 may control the controller 116 and/or the servo motor 112 to rotate the laser scanner 110 to each of the multiple angles to obtain measurements. For instance, the laser scanner may obtain a measurement at each of measurement angles 310, 320, 330, 340, and 350. The processor 140 may classify each of the measurements in the same manner as described above regarding block 1106. That is, the processor 110 may determine whether each measurement angle includes tall grass, an object, or a lower surface in the direction of the measurement angle. The method 1100 may proceed to block 1124.

At block 1124, the method 1100 may include determining whether an object is detected to a side. For example, the processor 140 may determine whether the left side measurement angle 310 or the right side measurement angle 350 detected an object. If an object is detected to a side, the method 1100 may proceed to block 1126. If no object is detected to a side, the method 1100 may proceed to block 1128.

In block 1126, the method 1100 may include turning away from an object detected to the side. For example, the lawnmower 100 may be in the scenario 700, where the lawnmower 100 is approaching an edge of an unmowed area. Since the laser scanner 110 detects the fence 602 at the right side measurement angle 350, the processor 140 may determine the navigation path 704 to turn away from the fence 602. After making the turn, the method 1100 may return to block 1104.

At block 1128, the method 1100 may include determining whether tall grass is detected to one of the sides. For example, the processor 140 may determine whether the left side measurement angle 310 or the right side measurement angle 350 detected tall grass. If tall grass is detected to a side, the method 1100 may proceed to block 1130. If no tall grass is detected to a side, the method 1100 may proceed to block 1132, where the method 1100 may end.

At block 1130, the method 1100 may include turning toward tall grass according to the configured mowing pattern. For example, the lawnmower 100 may be in the scenario 500, where the lawnmower 100 is approaching an edge of an unmowed area. Since no objects are located nearby, the processor 140 may determine the navigation path 540 that turns toward tall grass according to a mowing pattern. For example, the processor 140 may determine a U-turn for a straight mowing pattern or a right-angle turn for a spiral mowing pattern.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A lawnmower, comprising:
a cutting blade;
a laser scanner rotatably mounted above the cutting blade;
a first motor rotatably driving the laser scanner; and
a processor communicatively coupled to the laser scanner and configured to:
obtain laser scanner measurements of a plurality of angles around the lawnmower, each laser scanner measurement including a distance and a received signal strength;

classify a surface at each of the angles based on the distance and the received signal strength; and determine a navigation path of the lawnmower based on the classification of the surface at each of the angles.

2. The lawnmower of claim 1, further comprising a second motor operably coupled to one or more drive wheels, wherein the processor is configured to control the second motor to move the lawnmower along the navigation path.

3. The lawnmower of claim 1, further comprising a wireless receiver that receives a manual override signal from a remote control, wherein the processor controls the lawnmower according to the manual override signal instead of the navigation path.

4. The lawnmower of claim 1, wherein the processor is configured to classify a surface having a signal strength above a threshold as grass.

5. The lawnmower of claim 1, wherein the laser scanner is oriented at a downward angle, wherein the processor classifies the surface at each of the angles by comparing the distance to an object detection threshold and a grass detection threshold.

6. The lawnmower of claim 5, wherein the processor classifies the surface at one or more of the angles as tall grass to be mowed when the distance is between the object detection threshold and the grass detection threshold.

7. The lawnmower of claim 6, wherein the processor determines the navigation path to turn the lawnmower toward the angle where the surface is classified as tall grass in response to classifying a surface in a forward direction as either an object or a lower surface.

8. The lawnmower of claim 1, wherein the processor is configured to:

detect an object based on a signal strength less than a threshold strength and a detected distance less than a threshold distance; and determine the navigation path to avoid the object.

9. The lawnmower of claim 1, wherein the laser scanner is a one dimensional LIDAR scanner.

10. The lawnmower of claim 1, wherein the laser scanner is coupled to the first motor via a drive belt and coupled to the processor via serial communication.

11. A method of controlling lawnmower, comprising:

obtaining laser scanner measurements of a plurality of angles around the lawnmower, each laser scanner measurement including a distance and a received signal strength;

classifying a surface at each of the angles based on the distance and the received signal strength; and determining a navigation path of the lawnmower based on the classification of the surface at each of the angles.

12. The method of claim 11, further comprising controlling a drive motor of the power equipment to move the lawnmower along the navigation path.

13. The method of claim 11, further comprising:

receiving a manual override signal from a remote control; and controlling the lawnmower according to the manual override signal instead of the navigation path.

14. The method of claim 11, wherein a surface at each of the angles comprises classifying at least one surface having a signal strength above a threshold as grass.

15. The method of claim 11, wherein the laser scanner is oriented at a downward angle, and wherein classifying the surface at each of the angles comprises comparing the distance to an object detection threshold and a grass detection threshold.

16. The method of claim 15, wherein the classifying comprises classifying the surface at one or more of the angles as tall grass to be mowed when the distance is between the object detection threshold and the grass detection threshold.

17. The method of claim 16, wherein determining the navigation path comprises determining to turn the lawnmower toward the angle where the surface is classified as tall grass in response to classifying a surface in a forward direction as either an object or a lower surface.

18. The method of claim 11, further comprising:

detecting an object based on a signal strength less than a threshold strength and a detected distance less than an object detection threshold distance; and determine the navigation path to avoid the object.

19. A non-transitory computer-readable medium storing executable code for controlling a lawnmower, comprising code to:

obtain laser scanner measurements of a plurality of angles around the lawnmower from a laser scanner rotatably mounted to the lawnmower above a cutting blade at a downward angle, each laser scanner measurement including a distance and a received signal strength;

classifying a surface at each of the angles based on the distance and the received signal strength; and determining a navigation path of the lawnmower based on the classification of the surface at each of the angles.

20. The non-transitory computer-readable medium of claim 19, further comprising code to control a drive motor of the lawnmower to move the lawnmower along the navigation path.

* * * * *